(12) United States Patent
Yoshida

(10) Patent No.: US 7,516,551 B2
(45) Date of Patent: Apr. 14, 2009

(54) PORTABLE CUTTING TOOL

(75) Inventor: Hirokazu Yoshida, Niigata (JP)

(73) Assignee: Hitachi Koki Co., Ltd., Tokyo (JP)

( * ) Notice: Subject to any disclaimer, the term of this patent is extended or adjusted under 35 U.S.C. 154(b) by 304 days.

(21) Appl. No.: 11/374,127

(22) Filed: Mar. 14, 2006

(65) Prior Publication Data

US 2006/0213067 A1    Sep. 28, 2006

(30) Foreign Application Priority Data

Mar. 28, 2005    (JP)    .......................... P2005-091119

(51) Int. Cl.
*B27B 9/04*    (2006.01)
(52) U.S. Cl. .............................. 30/373; 30/391; 83/743; 83/745
(58) Field of Classification Search ........... 30/371–378, 30/370; 83/743, 745
See application file for complete search history.

(56) References Cited

U.S. PATENT DOCUMENTS

| | | | | |
|---|---|---|---|---|
| 2,346,961 A | * | 4/1944 | Gundelfinger et al. | 30/376 |
| 2,790,468 A | * | 4/1957 | Wilhide | 30/391 |
| 3,043,351 A | * | 7/1962 | Davis | 30/373 |
| 5,815,931 A | * | 10/1998 | Cleveland | 30/373 |
| 6,308,424 B1 | * | 10/2001 | Stielper | 30/391 |
| 6,543,142 B2 | * | 4/2003 | Bruce et al. | 30/391 |
| 6,708,411 B2 | * | 3/2004 | Kani | 30/376 |
| 7,103,979 B2 | * | 9/2006 | Yoshida et al. | 30/376 |
| 7,174,641 B2 | * | 2/2007 | Kondo et al. | 30/371 |
| 2002/0166240 A1 | | 11/2002 | Duford et al. | |

FOREIGN PATENT DOCUMENTS

| | | | |
|---|---|---|---|
| EP | 1428636 A1 | | 6/2004 |
| JP | 6-312402 | * | 11/1994 |
| JP | 2002370203 | | 12/2002 |

* cited by examiner

*Primary Examiner*—Hwei-Siu C Payer
(74) *Attorney, Agent, or Firm*—Mattingly, Stanger, Malur & Brundidge, P.C.

(57) ABSTRACT

In a portable electric circular saw (portable cutting tool) including a cutting tool body having a motor serving as a driving source and a saw blade (cutting tool) driven to rotate by the motor and a base guiding the cutting tool body along a surface of a material to be cut, and allowing a parallel ruler to be mounted on the base, guide bars respectively inserted through insertion holes formed in the base are provided with a dust guard that can slide parallel to an end face of the saw blade and can abut against the end face of the saw blade.

12 Claims, 10 Drawing Sheets

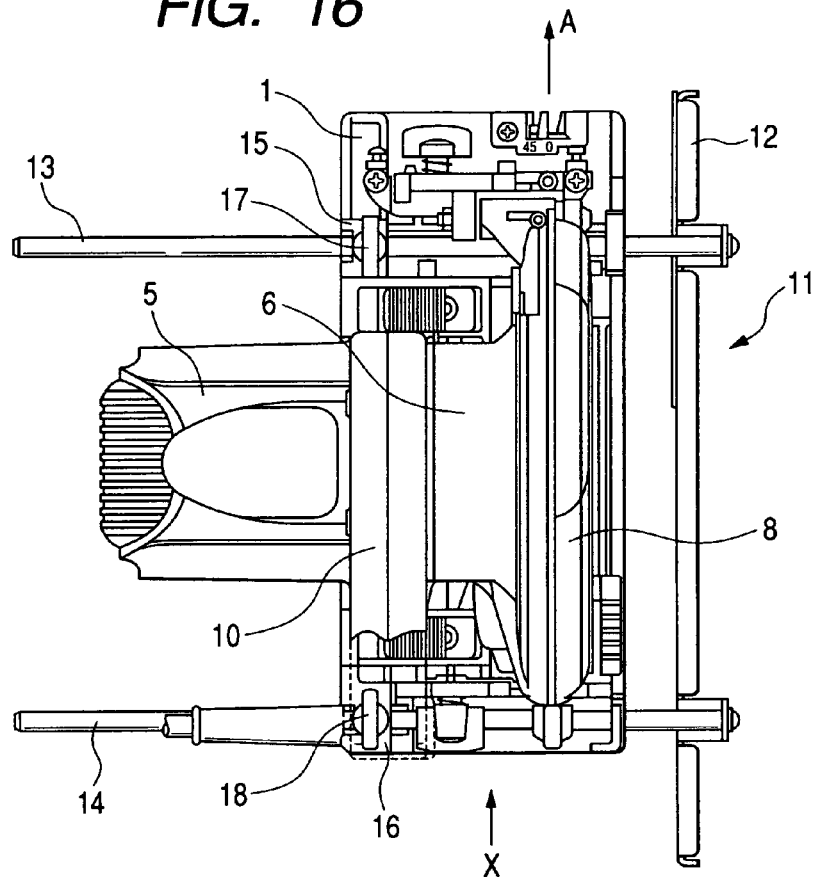
PRIOR ART FIG. 16
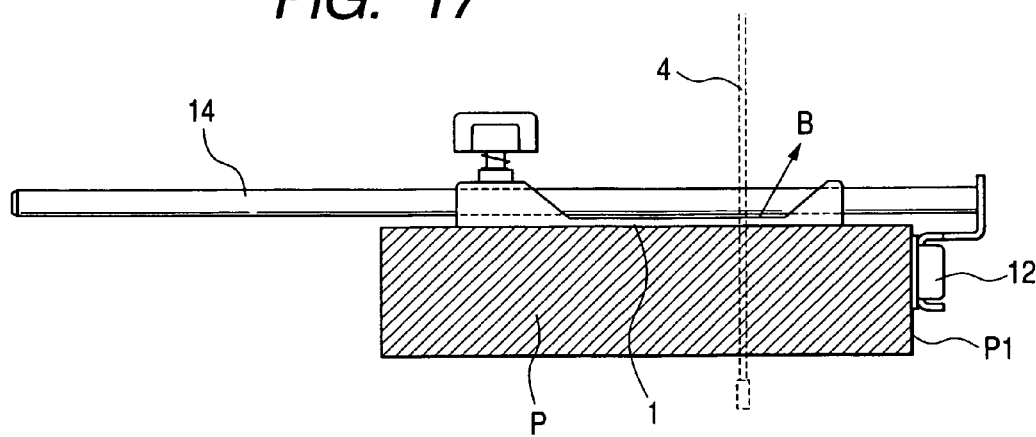
PRIOR ART FIG. 17

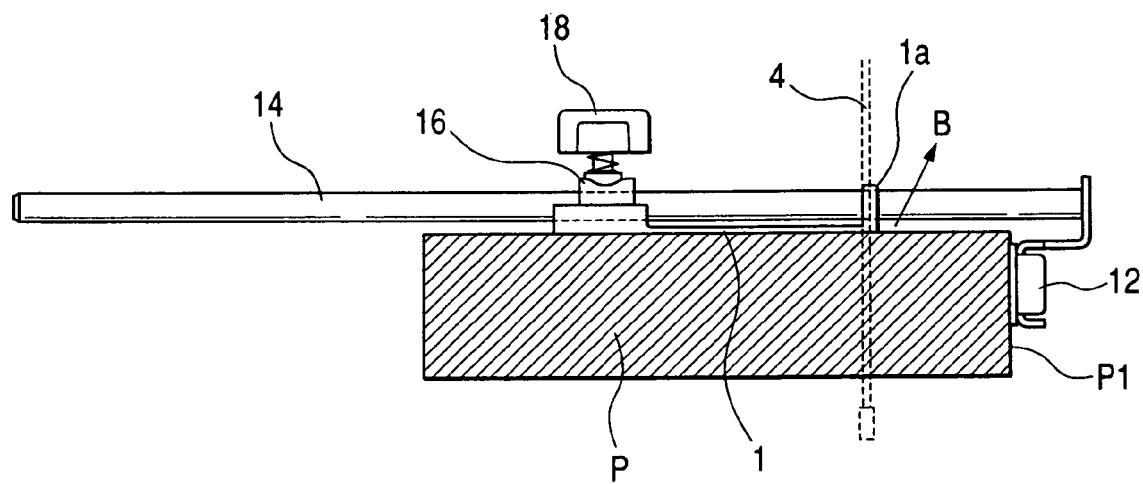
PRIOR ART FIG. 20

PORTABLE CUTTING TOOL

BACKGROUND OF THE INVENTION

1. Field of the Invention

The present invention relates to a portable cutting tool, such as a portable electric circular saw, on which a parallel ruler can be mounted.

2. Description of the Related Art

A conventional example of the portable electric circular saw as a form of the portable cutting tool is shown in FIGS. 14 and 15. In addition, FIG. 14 is a front view of a conventional electric circular saw, and FIG. 15 is a plan view of the conventional electric circular saw.

In a portable electric circular saw 11 shown in FIGS. 14 and 15, reference numeral 1 denotes a base, and reference numeral 2 denotes a circular saw body that can be rotated away from the base 1 about a supporting shaft 3 with respect to the base 1, can be adjusted in cutting length of a material to be cut, and can cut the material obliquely by the saw blade 4 inclined with respect to the material, rotating about a tilt shaft (not shown). In this case, the circular saw body 2 has a disc-like saw blade 4 for cutting a material (not shown) to be cut, such as a plate material, and a motor (not shown) as a driving source for rotating the saw blade 4.

A saw cover 8 is attached to a cover of a gear box 6 so as to cover the top of the saw blade 4, and a protective cover 9 is attached to the bottom of the saw blade 4 so as to expose a portion of the saw blade. In addition, the motor is housed in the motor housing 5, and its driving torque is reduced by a reduction gear (not shown) housed in the gear box 6 and is transmitted to a rotary shaft 7 of the saw blade 4 to rotate the saw blade 4 at a predetermined speed.

Therefore, as an operator forwardly pushes out a handle 10 with the base 1 placed on a material (not shown) to be cut while the saw blade 4 is driven to rotate as described above, the portable electric circular saw 11 cuts the material to be cut, by the saw blade 4 while it advances in a direction indicated by an arrow A in FIG. 15. In this case, it is difficult to accurately cut the material to be cut due to a gap between the handle 10 and the saw blade 4, along a cutting direction A in FIG. 15. Thus, a parallel ruler 12 is often used as shown in FIG. 16 so as to accurately guide the material along the cutting direction A (for example, see JP-A-6-312402).

FIG. 16 is a plan view of the conventional portable electric circular saw 11 on which the parallel ruler 12 is mounted. In the portable electric cutting circular saw 11 shown, a front guide bar 13 and a rear guide bar 14 are inserted through a front insertion hole 15 and a rear insertion hole 16, respectively, formed in front and rear portions (in upper and rear portions in FIG. 16) of the base 1, so that they are slidable in a right-and-left direction (a direction orthogonal to the cutting direction A) and parallel to each other. The guide bars 13, 14 are respectively fixed to the base 1 with a first fixing screw 17 and a rear fixing screw 18. Also, the parallel ruler 12 is attached parallel to an end face of the saw blade 4 between ends of both guide bars 13, 14 protruding from the base 1.

Here, the cutting operation by means of the portable electric circular saw 11 shown in FIG. 16 is shown in FIG. 17. Specifically, FIG. 17 is a partial view as seen in a direction indicated by an arrow X (a view showing only a portion needed for explanation of the cutting operation) in FIG. 16. In the cutting operation, as shown in the figure, the parallel ruler 12 is caused to slide along a side P1 of the material P to be cut, so that the cutting direction of the material P to be cut by the saw blade 4 can be surely guided. Also, chips are generated during cutting of a material P to be cut, and the chips are scattered in a direction indicated by an arrow B by the wind induced by rotation of the saw blade 4.

On the other hand, as one kind of cutting operation of a material to be cut, there is an operation to cut a floor material at the edge of a wall. In this operation, a circular saw (hereinafter, referred to as a wall-edge cutting circular saw) shown in FIGS. 18 and 19 is frequently used (see Japanese Patent No. 2933196). In addition, FIG. 18 is a plan view of a wall-edge cutting circular saw, and FIG. 19 is a plan view showing a procedure of the wall-edge cutting circular saw.

As shown in FIG. 19, when a floor material P at the wall edge is cut using the wall-edge cutting circular saw 11', the floor material P can be cut along the wall edge, in a state in which the circular saw body is rotated about the tilt shaft 3 and tilted at a predetermined angle with respect to the base 1, and the saw blade 4 protrudes outward from the side 1a of the base 1. If the wall-edge cutting circular saw 11' can cut the floor material P along the wall edge, the side 1a of the base 1 along the direction of the wall edge, and side 1a of the base 1 along the direction of the wall edge is shortened in order to avoid that the side 1a of the base 1 along the direction of the wall edge interferes with a wall W.

Here, an example in which the parallel ruler 12 is mounted on the wall-edge cutting circular saw 11' and the wall-edge cutting circular saw 11' is used for cutting other than the wall-edge cutting is shown in FIG. 20. Even in this case, chips are generated during cutting of the material P to be cut, and the chips are scattered in a direction indicated by an arrow B, by the wind induced by the rotation of the saw blade 4.

In the above-described portable electric circular saw 11 and wall-edge cutting circular saw 11', even in any usage patterns, chips generated during cutting operation are scattered to the surroundings and stuck on the operator, or deteriorate the visibility in cutting spots, therefore, the operation efficiency may be deteriorated.

SUMMARY OF THE INVENTION

The invention has been made in consideration of the above problems. The object of the invention is to provide a portable cutting tool that can prevent chips from scattering to improve the operation efficiency.

In order to achieve the above object, according to an aspect of the invention, there is provided a portable cutting tool including a cutting tool body having a motor serving as a driving source and a cutting tool driven to rotate by the motor, and a base guiding the cutting tool body along a surface of a material to be cut, and allowing a parallel ruler to be mounted on the base. Guide bars respectively inserted through insertion holes formed in the base are provided with a dust guard that is allowed to slide parallel to an end face of the cutting tool and abut against the end face of the cutting tool.

Preferably, the dust guard is slidably supported by the guide bars inserted through the insertion holes formed in the base, and allowed to be fixed to the guide bars with a fixing means.

Preferably, the insertion holes formed in the base are also used as sub-base mounting holes.

Preferably, one side of the base is positioned in the vicinity of a side of the cutting tool, and the dust guard is disposed outside the base.

Preferably, a fixed position of the dust guard when cutting is performed with the cutting tool body being rotated about a supporting shaft with respect to the base to tilt the cutting tool is allowed to change with respect to a fixed position of the dust guard when the cutting tool is not tilted with respect to the base.

Preferably, the parallel ruler is disposed on the same side as the dust guard or on the opposite side thereto, with the cutting tool as a boundary.

Preferably, a marker indicating the position of the cutting tool is provided in the dust guard.

Preferably, the dust guard is disposed such that its bottom face is positioned above a top face of the base.

According to the invention, since the dust guard is disposed in the vicinity of the cutting tool, chips generated by cutting collide against the dust guard, falling down and so are not scattered to the surroundings. Therefore, an operator can perform cutting operation with good operation efficiency while the chips are prevented from being stuck on the operator or impairing the visibility in cutting spots.

According to the invention, since the dust guard is caused to slide along the guide bars according to usage patterns of the portable cutting tool, and the dust guard can be fixed to the guide bars with the fixing means, scattering of chips can be always surely prevented by the dust guard irrespective of the usage patterns, thereby improving the operation efficiency.

According to the invention, since the insertion holes formed in the base are also used as sub-base mounting holes, the length of the base in the cutting direction can be reduced, and consequently, a portion left after cutting a material to be cut can be kept to a minimum.

According to the invention, for example, in a wall-edge cutting tool to be used when a floor material at a wall edge is cut, one side of the base is positioned in the vicinity of a side of the cutting tool. Even in this type of cutting tool, by disposing the dust guard outside the shortened one side of the base, the scattering of the chips can be surely prevented by the dust guard.

According to the invention, since the scattering direction of the chips when cutting is performed with the cutting tool tilted is different from scattering directions in the other cases (for example, when cutting is performed without tilting the cutting tool), the scattering of the chips can be surely prevented by the dust guard, changing the fixed position of the dust guard.

According to the invention, since the parallel ruler can be disposed on the same side as the dust guard or on the opposite side, with the cutting tool as a boundary, the versatility of the portable cutting tool can be improved.

According to the invention, checking the position of the cutting tool by means of the marker provided in the dust guard, an operator can perform cutting operation with high precision.

According to the invention, since the chips collide against the bottom face of the dust guard positioned above the top face of the base and fall down, the dust guard can exhibit its function sufficiently, and consequently, scattering of chips can be surely prevented.

BRIEF DESCRIPTION OF THE DRAWINGS

FIG. 16 is a plan view of the conventional electric circular saw on which a parallel ruler is mounted;

FIG. 17 is a partial view seen in a direction indicated by an arrow X (a view showing only a portion needed for explanation of cutting operation) in FIG. 16;

FIG. 20 is a partial view seen in a direction indicated by an arrow X (a view showing only a portion needed for explanation of cutting operation) in FIG. 18.

DETAILED DESCRIPTION OF THE PREFFERED EMBODIMENTS

Hereinafter, embodiments in which the invention is applied to a portable electric circular saw will be described.

<Embodiment 1>

Figure 1:
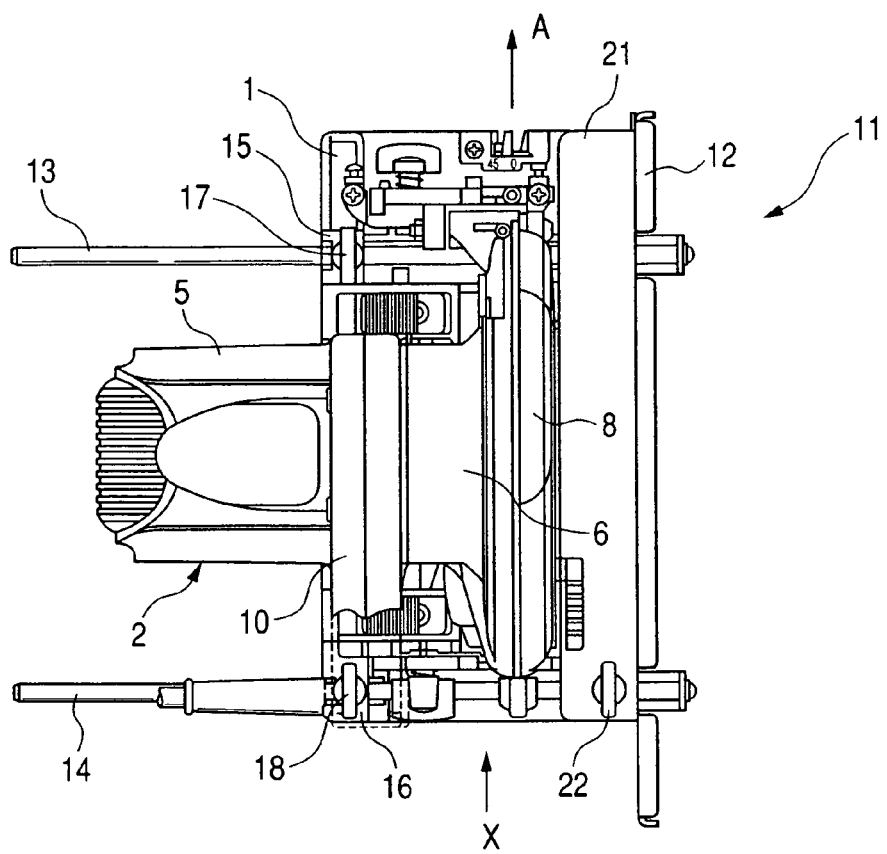
FIG. 1 is a plan view of a portable electric circular saw according to Embodiment 1 of the invention.
Figure 2:
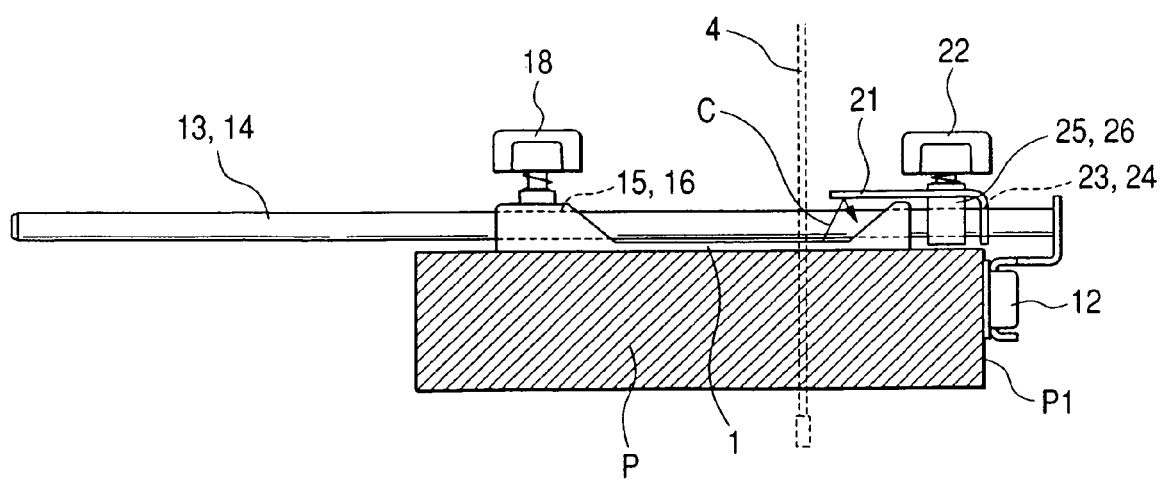
FIG. 2 is a partial view seen in a direction indicated by an arrow X (a view showing only a portion needed for explanation of cutting operation) in FIG. 1.
Figure 3:
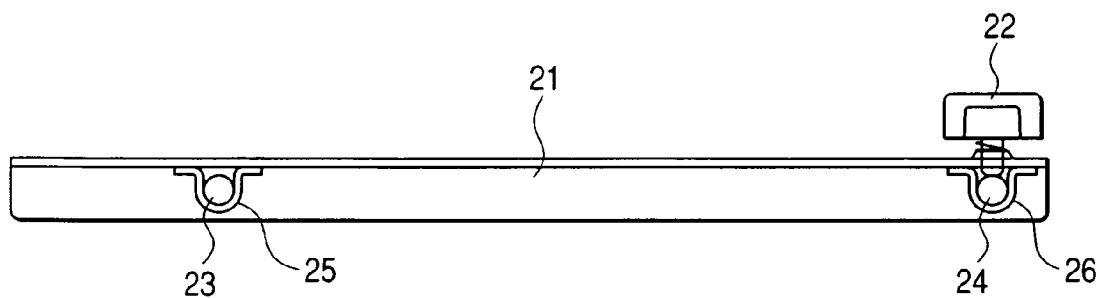
FIG. 3 is a plan view of a dust guard of the portable electric circular saw according to Embodiment 1 of the invention.

FIG. 1 is a plan view of a portable electric circular saw according to Embodiment 1 of the invention, FIG. 2 is a partial view as seen in a direction indicated by an arrow X (a view showing only a portion needed for explanation of cutting operation) in FIG. 1, and FIG. 3 is a plan view of a dust guard. The same elements in these drawings as those shown in FIGS. 14 to 20 are denoted by the same reference numerals and the repetitive description thereof will be omitted.

In a portable electric circular saw 11 according to the present embodiment, similar to the conventional example, the length of a front guide bar 13 and a rear guide bar 14 that are slidably inserted through a front insertion hole 15 and a rear insertion hole 16, respectively, formed in a base 1 is greater than the width of the base 1. A parallel ruler 12 is mounted on an end extending outward from one side of the base 1 parallel to an end face of a circular blade 4 (see FIG. 2).

In addition, in the front guide bar 13 and the rear guide bar 14, a dust guard 21 having an L-shaped cross section is inserted and held slidably in a direction (a right-and-left direction in FIGS. 1 and 2) perpendicular to a cutting direction A (see FIG. 1). The dust guard 21 is disposed in the vicinity of the saw blade 4 so as to bury a gap between a circular saw body 2 (a saw cover 8) and the parallel ruler 12 and is fixed to the rear guide bar 14 with a fixing screw 22.

As shown in FIG. 3, both longitudinal sides of the dust guard 21 is formed with a front insertion hole 23 and a rear insertion hole 24 into which the front guide bar 13 and the rear guide bar 14 are to be inserted, respectively. Support brackets 25, 26 for supporting the dust guard 21 on the front guide bar 13 and the rear guide bar 14 are tied to a bottom face of the dust guard. In addition, as shown in FIG. 2, the dust guard 21 is disposed such that its bottom face is positioned above a top face of the base 1.

Therefore, an operator pushes a handle 10 forward in a state in which a material P to be cut is put under the base 1, as shown in FIG. 2 and the parallel ruler 12 is caused to touch a side P1 of the material P to be cut, while the saw blade 4 is driven to rotate in a predetermined rotation direction (in a direction indicated by the arrow in FIG. 14) by a motor (not shown) built in the motor housing 5, whereby the portable electric circular saw 11 advances in a direction indicated by an arrow A in FIG. 1 to cut the material P to be cut by the cutting blade 4 while being accurately guided along the cutting direction y the parallel ruler 12. At this time, chips are generated by cutting of the material P to be cut. The chips are blown way in a direction indicated by an arrow C in FIG. 2, by the wind induced by the rotation of the saw blade 4. However, as shown in the figure, since the chips collide against the bottom face of the dust guard 21 and fall down, scattering of the chips to the surroundings is prevented. As a result, the operator an perform cutting operation with good operation efficiency while the chips are prevented from being stuck on the operator or impairing the visibility in cutting spots.

Figure 4:
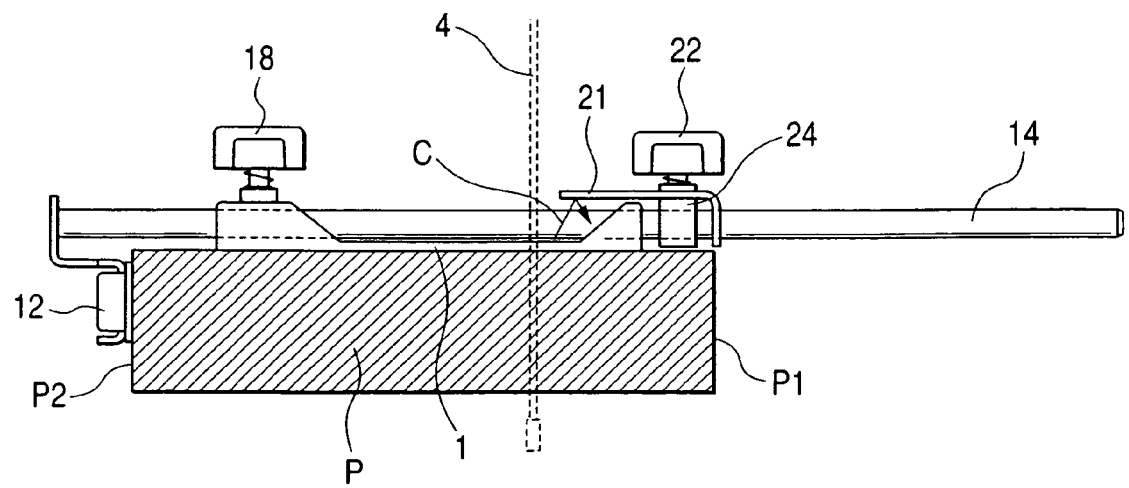
FIG. 4 is a view similar to FIG. 2, showing another usage pattern of the portable electric circular saw according to Embodiment 1 of the invention.

Meanwhile, in the present embodiment, the parallel ruler 12 is disposed on the same side as the dust guard 21 with respect to the saw blade 4 as a boundary. However, as shown in FIG. 4, the parallel ruler 12 may be provided at the opposite side of the dust guard 21. With this configuration, the same effects can be obtained and the versatility of the portable electric circular saw 11 can be improved.

In addition, in the present embodiment, only the fixing screw 22 is provided for fixing the dust guard 21 to the rear guide bar 14. However, a fixing screw may be provided for fixing the dust guard 21 to the front guide bar 13.

<Embodiment 2>

Figure 5:
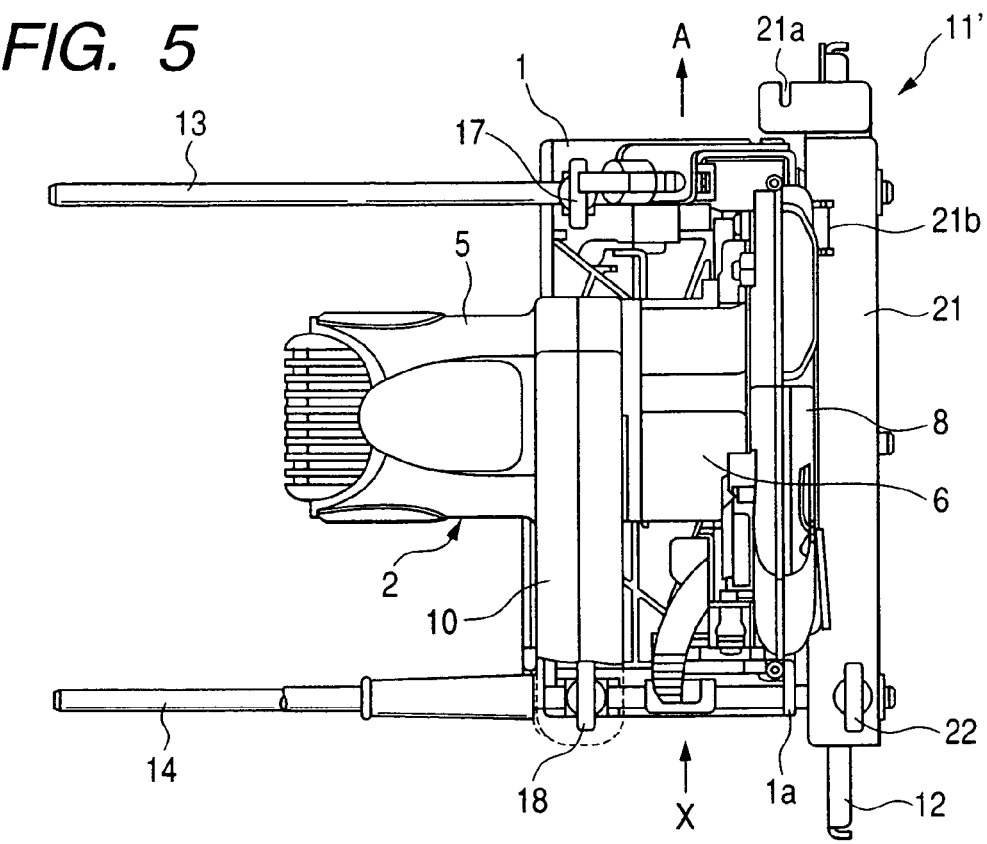
FIG. 5 is a plan view of a wall-edge cutting circular saw according to Embodiment 2 of the invention.
Figure 6:
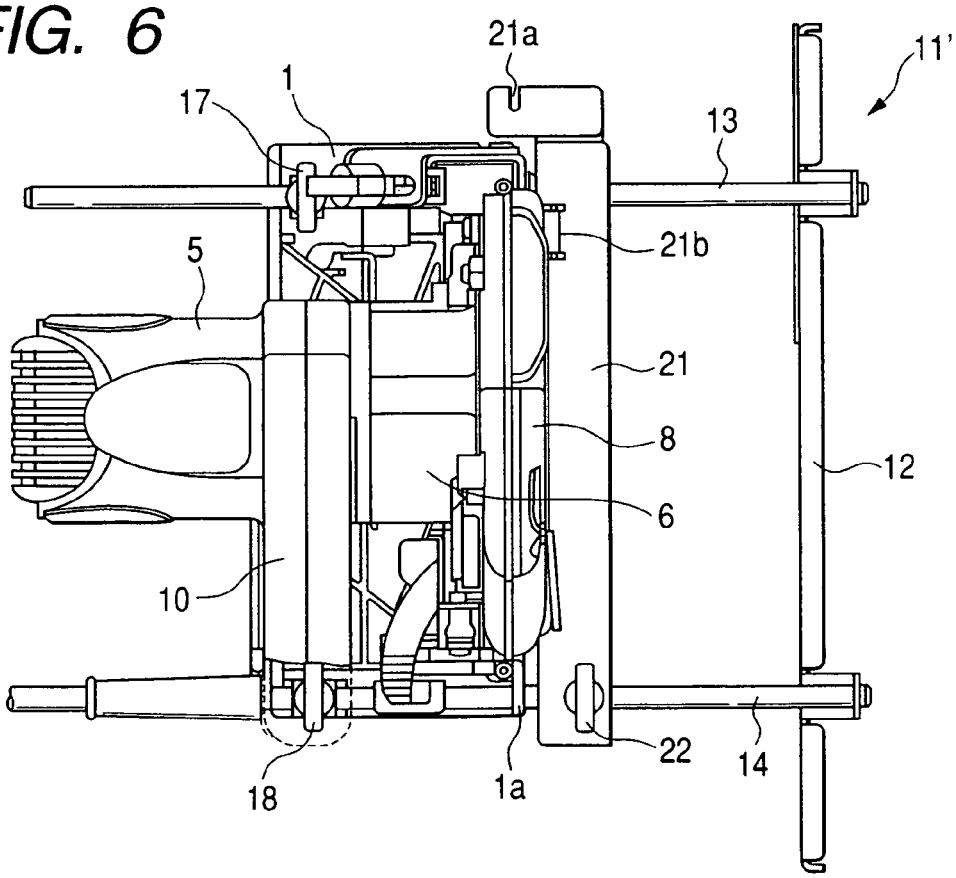
FIG. 6 is a plan view of a wall-edge cutting circular saw according to Embodiment 2 of the invention.
Figure 7:
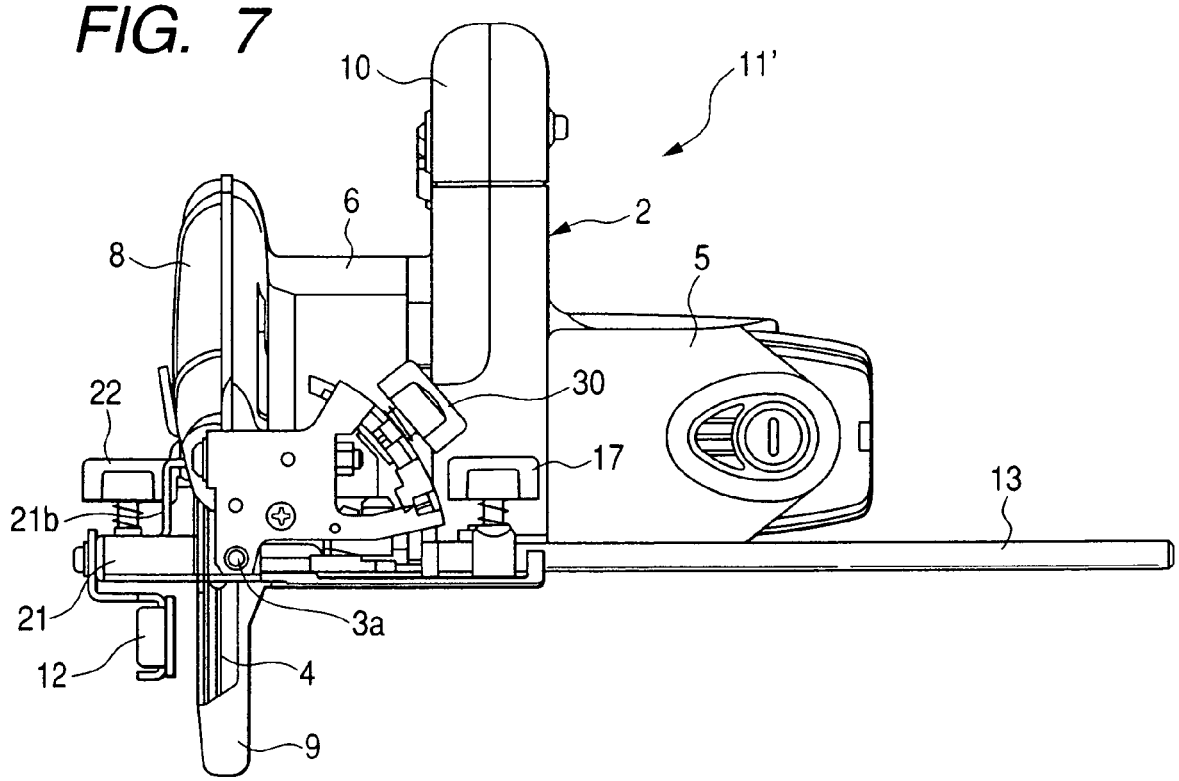
FIG. 7 is a rear view of the wall-edge cutting circular saw according to Embodiment 2 of the invention.
Figure 8:
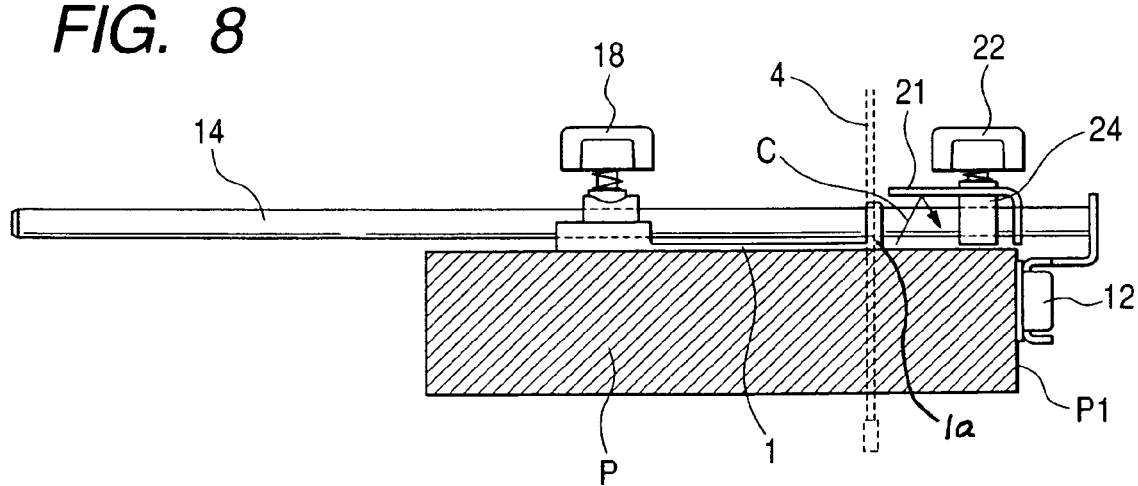
FIG. 8 is a partial view seen in a direction indicated by an arrow X (a view showing only a portion needed for explanation of cutting operation) in FIG. 5.
Figure 9:
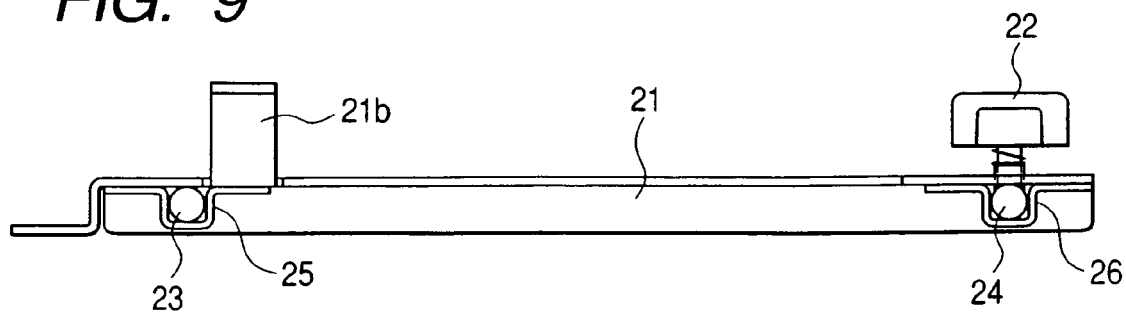
FIG. 9 is a plan view of a dust guard of the portable electric circular saw according to Embodiment 2 of the invention.

Next, Embodiment 2 of the invention will be described with reference to FIGS. 5 to 9. FIGS. 5 and 6 are plan views of a wall-edge cutting circular saw according to the present embodiment, FIG. 7 is a rear view of the wall-edge cutting circular saw, FIG. 8 is a partial view seen in a direction indicated by an arrow X (a view showing only a portion needed for explanation of cutting operation) in FIG. 5, and FIG. 9 is a plan view of a dust guard. The same elements in these drawings as those shown in FIGS. 1 to 4 are denoted by the same reference numerals. Hereinafter, only characterizing portions of the present embodiment will be described.

A wall-edge cutting circular saw 11 according to the present embodiment is, for example, a saw that can cut a floor material along a wall edge. In this circular saw, one side 1a of a base 1 is shortened, and as shown in FIG. 8, the side 1a is positioned in the vicinity of the side of a saw blade 4.

Therefore, in the wall-edge cutting circular saw 11', a parallel ruler 12 is fixed to the ends of a front guide bar 13 and a rear guide bar 14 that protrude outward from the side 1a of the base 1. Inside both guide bars 13 and 14, a dust guard 21 having an L-shaped cross section is inserted and held so as to bury a gap between a circular saw body 2 (a saw cover 8) and the parallel ruler 12. The dust guard 21 is fixed to the rear guide bar 14 with a fixing screw 22. In addition, FIG. 6 shows that the parallel ruler 12 is greatly pulled out from the dust guard 21.

Here, as shown in FIG. 9, both longitudinal sides of the dust guard 21 is formed with a front insertion hole 23 and a rear insertion hole 24 into which the front guide bar 13 and the rear guide bar 14 to be inserted, respectively. Support brackets 25, 26 for supporting the dust guard 21 on the front guide bar 13 and the rear guide bar 14 are tied to a bottom face of the dust guard. In addition, as shown in FIG. 8, the dust guard 21 is disposed so that its bottom face is positioned above a top face of the base 1.

As shown in FIGS. 5 and 6, a groove 21a serving as a marker that indicates the position of the saw blade 4 is formed at a front end of the dust guard 21, and a stopper 21b is erected in the vicinity of the groove 21a. Here, the stopper 21b is formed in an inverted L-shape so as to protrude horizontally toward the saw blade 4. In a state in which the stopper 21b, as shown in FIGS. 5 and 6, is brought into abutment against an end face of the saw cover 8 to fix the dust guard 21 with the fixing screw 22, the groove 21a formed at the front end of the dust guard 21 is set so as to accurately indicate the position of the saw blade 4. In addition, although not shown, if the dust guard is provided with another stopper that protrudes in a direction opposite to the stopper 21b, the position of the saw blade 4 can be accurately indicated by the groove 21a, irrespective of the mounting direction (front-and-rear direction) of the dust guard 21.

Therefore, in case some part other than the wall edge of a material P to be cut is cut using the wall-edge cutting circular saw 11', an operator pushes the handle 10 forward in a state in which a material P to be cut is put under the base 1, as shown in FIG. 8 and the parallel ruler 12 is caused to touch a side P1 of the material P to be cut, while the saw blade 4 is driven to rotate by a motor (not shown) built in the motor housing 5, whereby the wall-edge cutting circular saw 11' advances in a direction indicated by the arrow A in FIG. 5 to cut the material P to be cut by the cutting blade 4 while being accurately guided along the cutting direction by the parallel ruler 12. At this time, chips are generated by cutting of the material P to be cut. The chips are blown away in a direction indicated by an arrow C in FIG. 8 by the wind induced by the rotation of the saw blade 4. However, as shown in the figure, since the chips collides against the bottom face of the dust guard 21 and fall down, scattering of the chips to the surroundings is prevented. As a result, the operator can perform cutting operation with good operation efficiency while the chips are prevented from being stuck on the operator or impairing the visibility in cutting spots.

Also, the operator visually recognizes the groove 21a formed at the front end of the dust guard 21, whereby he/she can perform cutting operation with high accuracy while accurately grasping the position of the saw blade 4, using the groove as a marker.

Figure 10:
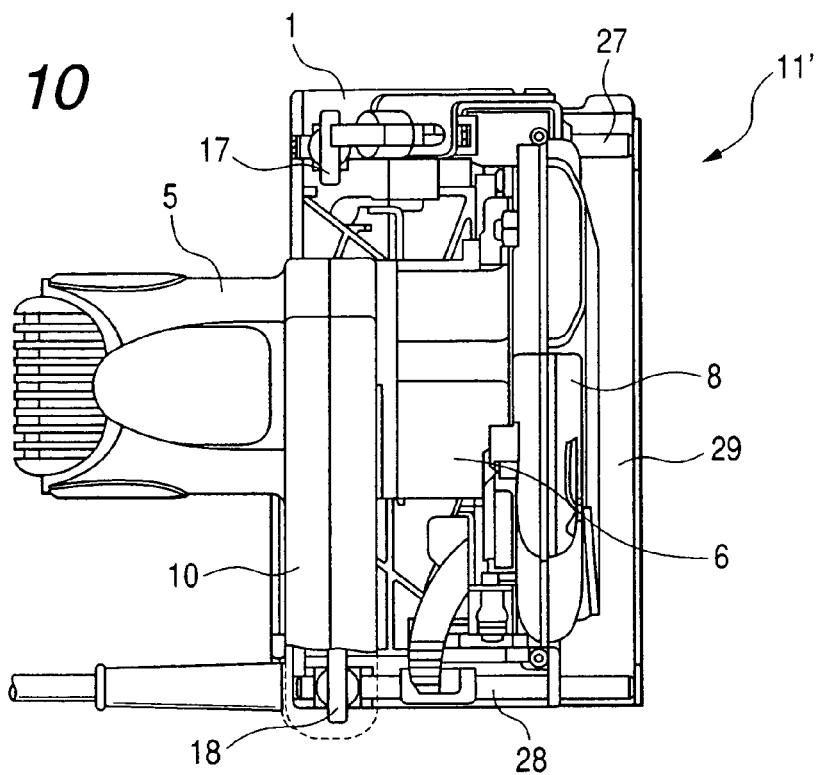
FIG. 10 is a plan view of the wall-edge cutting circular saw on which a sub base is mounted.

In addition, in case the wall-edge cutting circular saw 11' according to the present embodiment is used for cutting of some part other than the wall edge, as shown in FIG. 10, a sub base 29 having two guide bars 27, 28 similar to the front guide bar 13 and the rear guide bar 14 is used. In this case, if the front insertion hole 15 and the rear insertion hole 16 formed in the base 1 are also used as sub-base mounting holes (holes into which the guide bars 27, 28 to be inserted), the length of the base 1 in the cutting direction (in the vertical direction in FIG. 10) is reduced. As a result, a portion left after cutting a material to be cut can be kept to a minimum.

Next, the operation of when a material to be cut is obliquely cut by the wall-edge cutting circular saw according to the present embodiment will be described with reference to FIGS. 11 to 13. In addition, FIG. 11 is a rear view of the wall-edge cutting circular saw showing that the circular saw body is rotated with respect to the base, and FIGS. 12 and 13 are partial views (views showing only a portion needed for explanation of cutting operation) showing an oblique cutting operation of a material to be cut.

Figure 11:
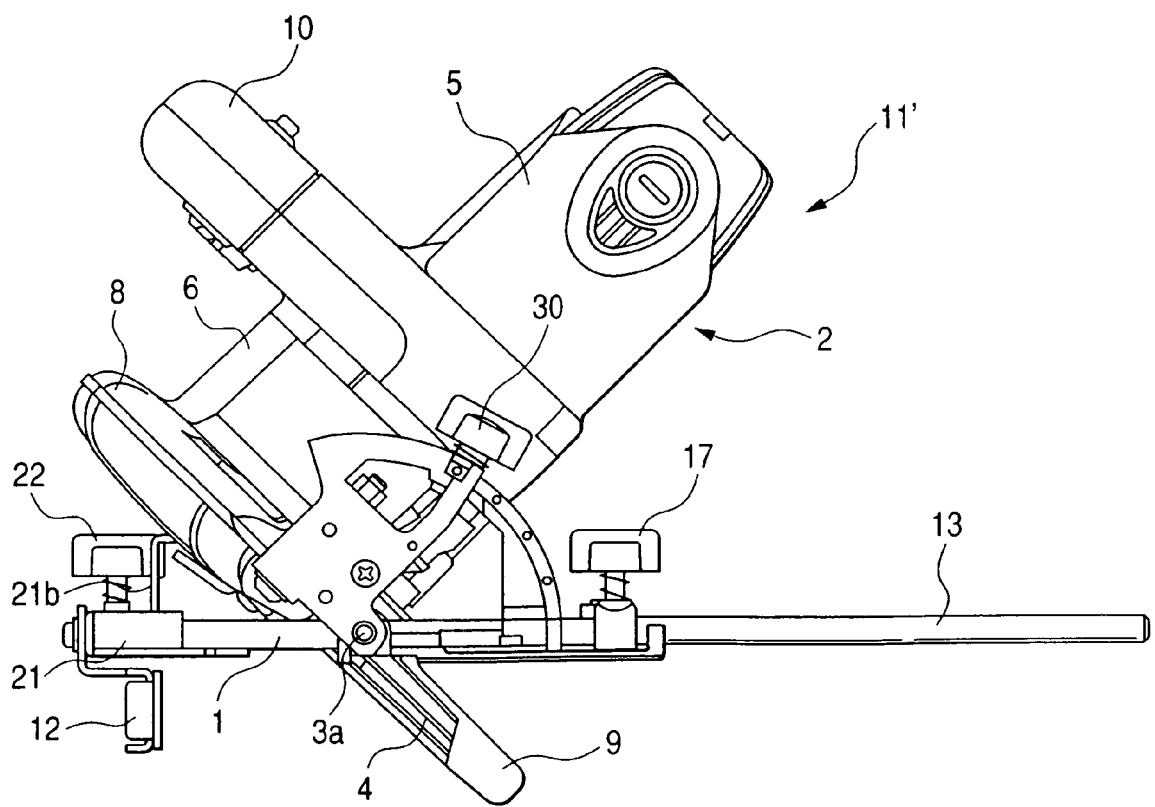
FIG. 11 is a rear view showing a state in which a circular saw body of the portable electric circular saw according to Embodiment 2 of the invention is rotated with respect to a base.

In the wall-edge cutting circular saw, as shown in FIG. 11, the circular saw body 2 is supported so as to be rotatable about a tilt shaft 3a with respect to the base 1. In oblique cutting, the fixing screw 30 is loosened, with the fixing screw 22 released, to rotate the circular saw body 2 by a predetermined degree of angle with respect to the base 1 (or to rotate the base 1 by a predetermined degree of angle with respect to the circular saw body 2) and bring the stopper 21b of the dust guard 21 into abutment against the end face of the saw cover 8. Then, the saw blade 4 of the circular saw body 2 is tilted by the same angle with respect to the base 1, and in cooperation with this, the dust guard 21 is positioned at a predetermined position. In addition, since the fixing screw 30 is disposed in a direction orthogonal to an axial direction of the tilt shaft 30a, the longitudinal length of the wall-edge cutting circular saw 11' can be reduced and the size of a portion left after cutting in wall edge cutting can be reduced.

Figure 12:
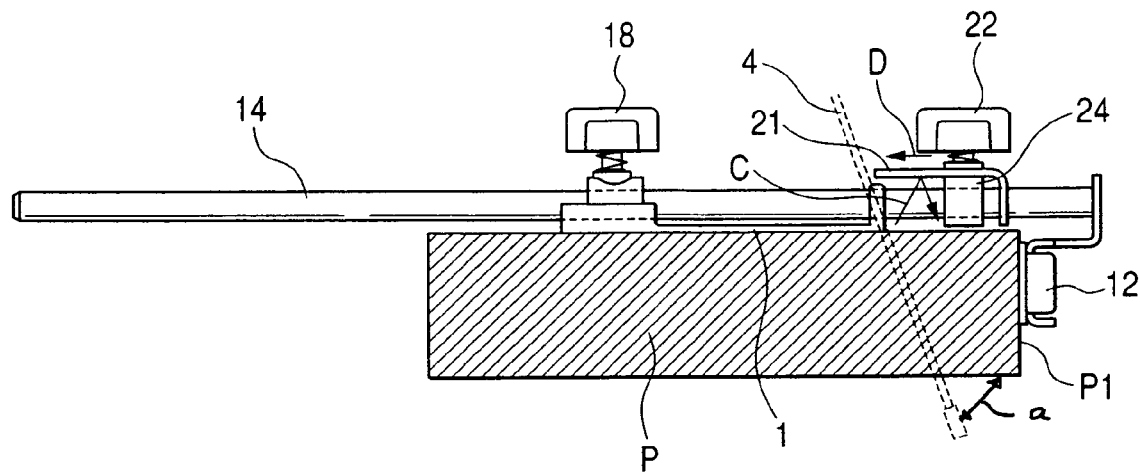
FIG. 12 is a partial view (a view showing only a portion needed for explanation of cutting operation) showing oblique cutting by the wall-edge cutting circular saw according to Embodiment 2 of the invention.
Figure 13:
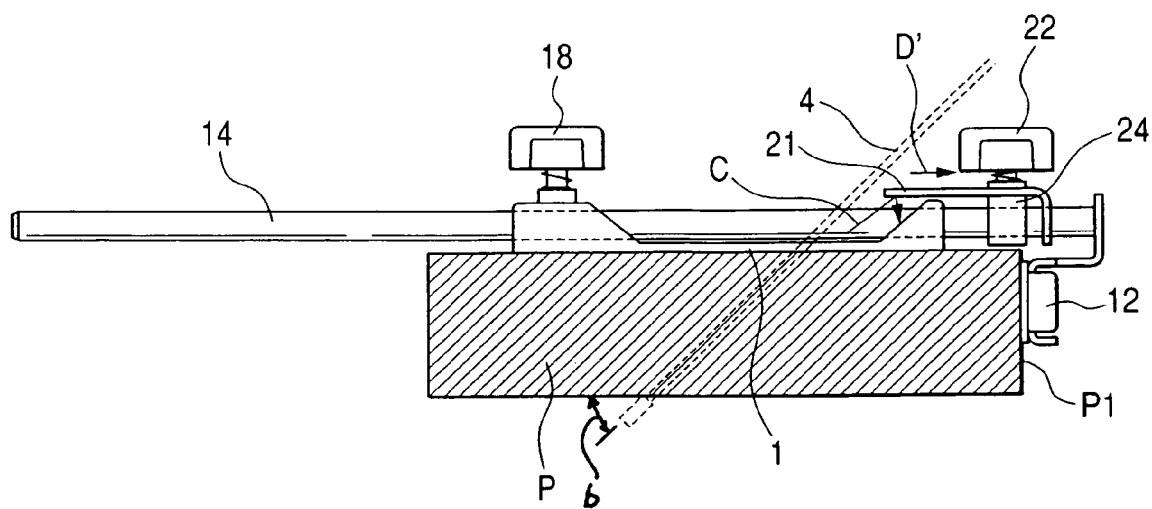
FIG. 13 is a partial view (a view showing only a portion needed for explanation of cutting operation) showing oblique cutting by the wall-edge cutting circular saw according to Embodiment 2 of the invention.
Figure 14:
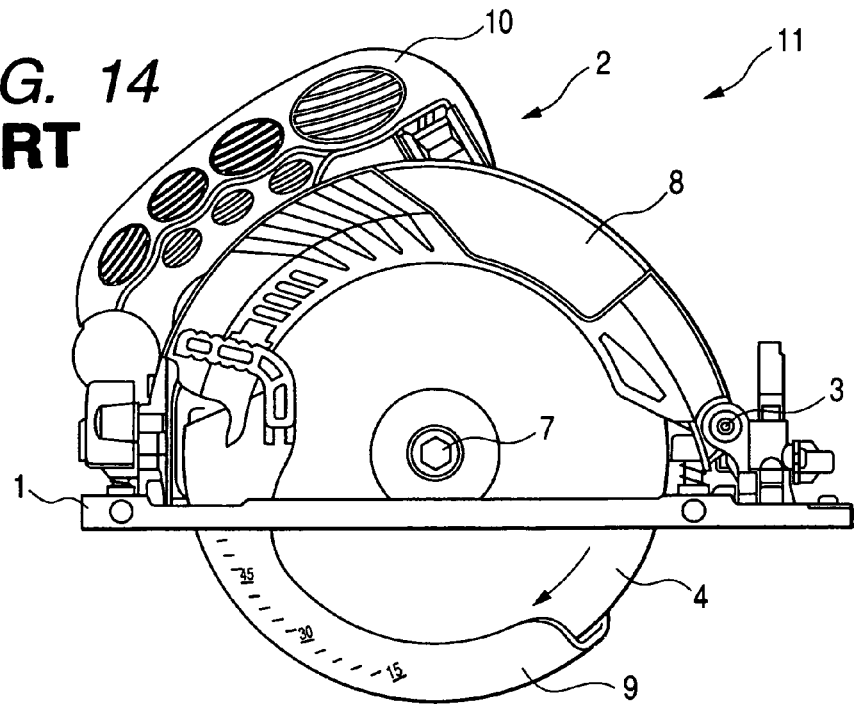
FIG. 14 is a front view of a conventional electric circular saw.
Figure 15:
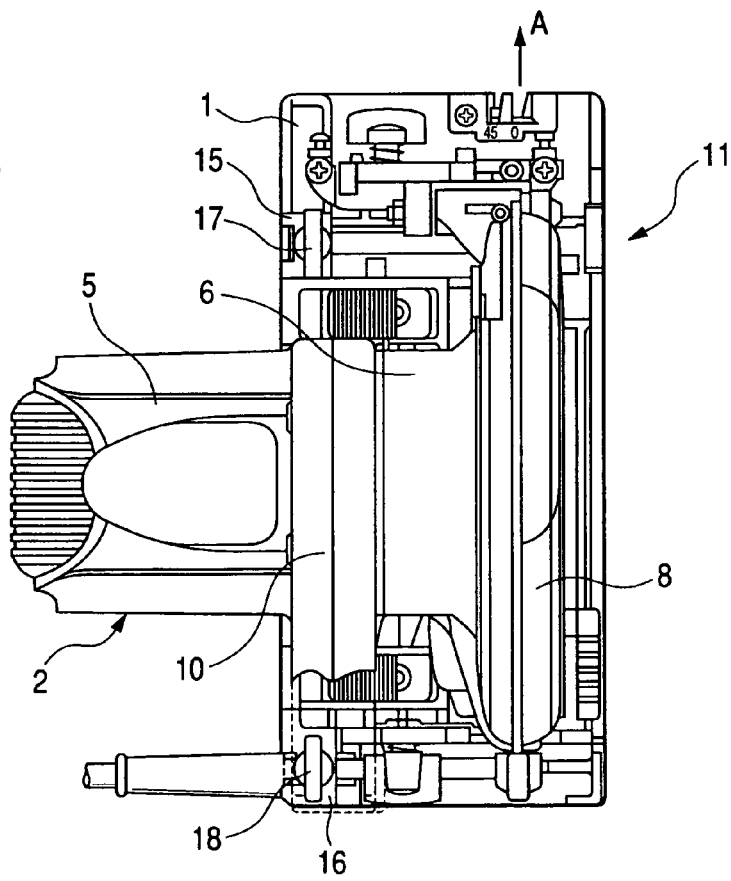
FIG. 15 is a plan view of the conventional electric circular saw.
Figure 18:
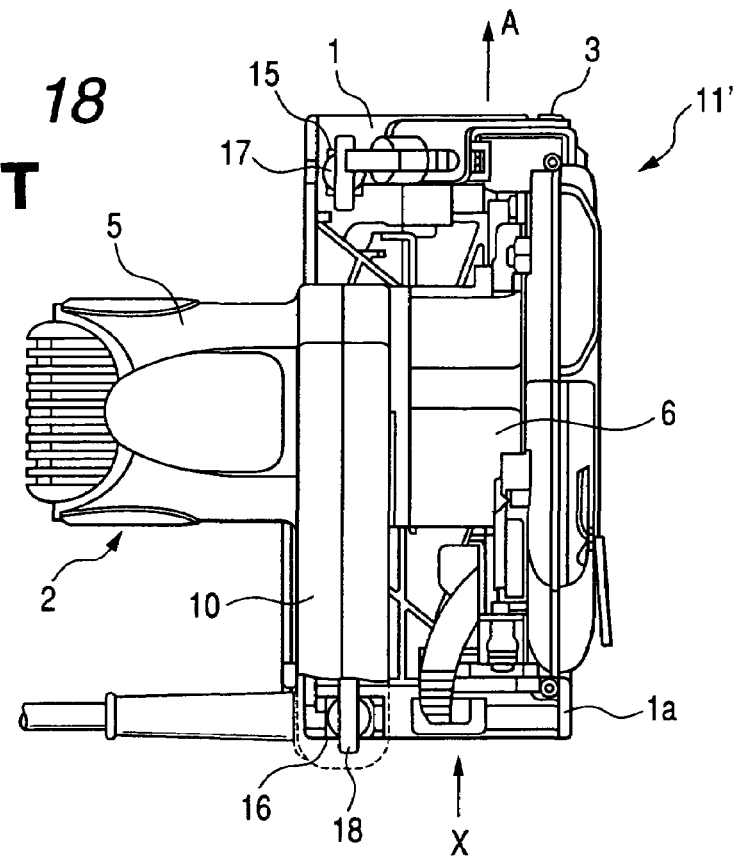
FIG. 18 is a plan view of a conventional wall-edge cutting circular saw.
Figure 19:
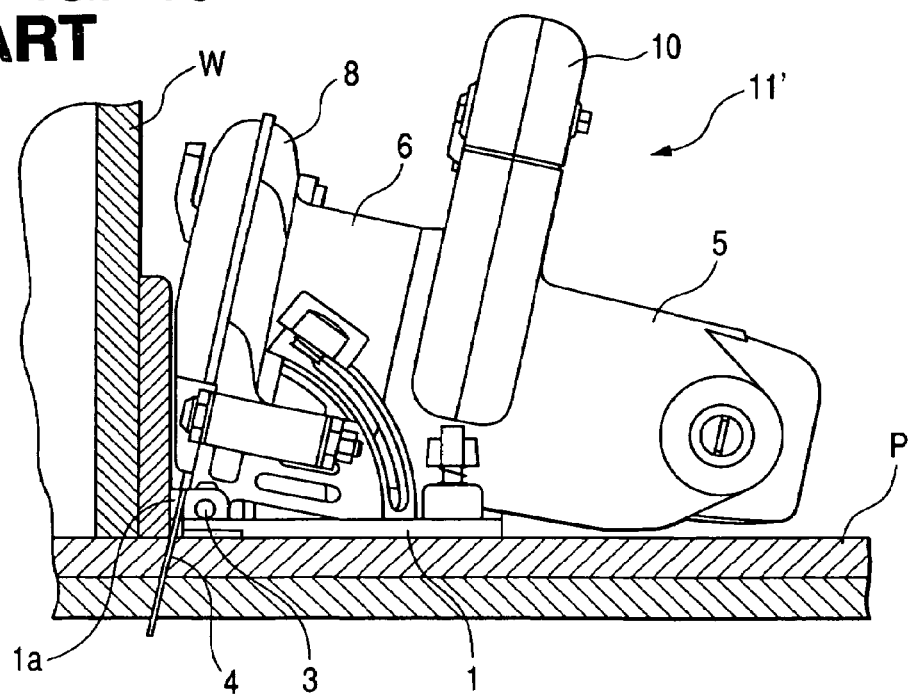
FIG. 19 is a plan view of the conventional wall-edge cutting circular saw.

Therefore, as shown in FIG. 12, in case cutting is performed with the saw blade 4 tilted at an angle a, in a direction shown in the figure, with respect to a material P to be cut, an operator pushes the handle 10 forward (see FIG. 11) in a state in which the material P to be cut is put under the base 1, and the parallel ruler 12 is caused to touch a side of P1 of the material P to be cut, while the saw blade 4 is driven to rotate by a motor (not shown). Thereby the wall-edge cutting circular saw 11' advances toward the reverse side of the paper of FIG. 12 to obliquely cut the material P to be cut by the cutting blade 4 while being accurately guided along the cutting direction by the parallel ruler 12. In this case, the dust guard 21 is moved in a direction indicated by an arrow D in FIG. 12 from the position when the material P to be cut is cut by the perpendicular saw blade 4, as shown in FIG. 8, and is fixed to a position to cover the cutting spot of the material P to be cut from the top.

Accordingly, even in this case, chips are generated by cutting of the material P to be cut. The chips are blown away in a direction indicated by an arrow C in FIG. 12 by the wind induced by the rotation of the saw blade 4. However, as shown in the figure, since the chips collides against the bottom face of the dust guard 21 and fall down, scattering of the chips to the surroundings is prevented. As a result, similar to the above, the operation efficiency can be improved.

In addition, as shown in FIG. 13, in case cutting is performed on the material P to be cut with the saw blade 4 tilted at an angle b shown in the figure in an opposite direction of that in FIG. 12, an operator pushes the handle 10 forward (see FIG. 11) in a state in which the material P to be cut is put under the base 1, and the parallel ruler 12 is caused to touch a side P1 of the material P to be cut, while the saw blade 4 is driven to rotate by a motor (not shown). Thereby, the wall-edge cutting circular saw 11' advances toward the reverse side of the paper of FIG. 13 to obliquely cut the material P to be cut by the cutting blade 4 while being accurately guided along the cutting direction by the parallel ruler 12. In this case, the dust guard 21 is moved in a direction (a direction opposite to the D direction shown in FIG. 12) indicated by an arrow D' in FIG. 13 from the position when the material P to be cut is cut by the perpendicular saw blade 4, as shown in FIG. 8, and is fixed to a position to cover the cutting spot of the material P to be cut from the top.

Accordingly, even in this case, chips are generated by cutting of the material P to be cut. The chips are blown away in a direction indicated by an arrow C in FIG. 13 by the wind induced by the rotation of the saw blade 4. However, as shown in the figure, since the chips collides against the bottom face of the dust guard 21 and fall down, scattering of the chips to the surroundings is prevented. As a result, similar to the above, the operation efficiency can be improved.

As described above, according to the portable electric circular saw 11 and the wall-edge cutting circular saw 11' relating to the invention, scattering of the chips to the surroundings can be surely prevented irrespective of its usage pattern by the dust guard 21, thereby improving the operation efficiency.

The invention can be similarly applied to other arbitrary potable cutting tools, not limited to the portable circular saw.

What is claimed is:

1. A portable cutting device comprising:
    a cutting tool body having a motor serving as a driving source and a cutting tool driven to be rotated by the motor,
    a base guiding the cutting tool body along a surface of a material to be cut,
    a parallel ruler mounted on the base,
    guide bars respectively inserted through insertion holes formed in the base, and
    a dust guard slidably supported on the guide bars for movement toward and away from the cutting tool, the dust guard including means slidably supporting the dust guard on the guide bars and a dust guard position, and
    wherein a marker indicating the position of the cutting tool is provided on the dust guard.

2. The portable cutting device according to claim 1, which further includes means for holding the dust guard in a first position on the guide bars.

3. The portable cutting device according to claim 1, which further includes a sub-base mounted to the base and wherein the insertion holes formed in the base are also used as sub-base mounting holes.

4. The portable cutting device according to claim 1, wherein one side of the base is positioned in the vicinity of a side of the cutting tool, and the dust guard is disposed outside the base.

5. The portable cutting device according to claim 1, wherein the cutting tool body is rotatable about a supporting shaft with respect to the base to tilt the cutting tool and means are provided for changing a fixed position of the dust guard on the guide bars when the cutting tool body is rotated.

6. The portable cutting device according to claim 1, wherein the parallel ruler is disposed on the same side as the dust guard or on the opposite side thereto, with the cutting tool as a boundary.

7. A portable cutting device comprising:
    a cutting tool body having a motor serving as a driving source and a cutting tool driven to be rotated by the motor,
    a base guiding the cutting tool body along a surface of a material to be cut, a parallel ruler mounted on the base, guide bars respectively inserted through insertion holes formed in the base, and a dust guard slidably supported on the guide bars for movement toward and away from the cutting tool, the dust guard including means slidably supporting the dust guard on the guide bars and a dust guard position, and wherein the dust guard is disposed such that its bottom face is positioned over and above a top face of the base.

8. The portable cutting device according to claim 7, which further includes means for holding the dust guard in a first position on the guide bars.

9. The portable cutting device according to claim 7, which further includes a sub base mounted to the base and wherein the insertion holes formed in the base are also used as sub-base mounting holes.

10. The portable cutting device according to claim 7, wherein one side of the base is positioned in the vicinity of a side of the cutting tool, and the dust guard is disposed outside the base.

11. The portable cutting device according to claim 7, wherein the cutting tool body is rotatable about a supporting shaft with respect to the base to tilt the cutting tool and means are provided for changing a fixed position of the dust guard on the guide bars when the cutting tool body is rotated.

12. The portable cutting device according to claim 7, wherein the parallel ruler is disposed on the same side as the dust guard or on the opposite side thereto, with the cutting tool as a boundary.

* * * * *